United States Patent
Rose

(10) Patent No.: US 9,542,421 B2
(45) Date of Patent: Jan. 10, 2017

(54) SEQUENCING ELECTRONIC FILES

(75) Inventor: Robert Brett Rose, Boulder, CO (US)

(73) Assignee: Google Inc., Mountain View, CA (US)

( * ) Notice: Subject to any disclaimer, the term of this patent is extended or adjusted under 35 U.S.C. 154(b) by 786 days.

(21) Appl. No.: 13/357,316

(22) Filed: Jan. 24, 2012

(65) Prior Publication Data
US 2013/0191754 A1 Jul. 25, 2013

(51) Int. Cl.
G06F 3/0481 (2013.01)
G06F 17/30 (2006.01)
G06Q 10/10 (2012.01)
G06Q 30/02 (2012.01)
H04N 1/00 (2006.01)

(52) U.S. Cl.
CPC ....... *G06F 17/30274* (2013.01); *G06F 3/0481* (2013.01); *G06F 17/30041* (2013.01); *G06F 17/30056* (2013.01); *G06Q 10/10* (2013.01); *G06Q 30/02* (2013.01); *H04N 1/00198* (2013.01)

(58) Field of Classification Search
CPC ............ G06F 17/30274; G06F 17/30038; G06F 21/10; G06F 17/30041; H04N 1/00198; G06Q 10/10; G06Q 30/02
See application file for complete search history.

(56) References Cited

U.S. PATENT DOCUMENTS

| | | | |
|---|---|---|---|
| 7,383,497 B2* | 6/2008 | Glenner et al. | 715/231 |
| 7,657,845 B2* | 2/2010 | Drucker et al. | 715/833 |
| 7,698,645 B2* | 4/2010 | Fuse | 715/730 |
| 8,856,656 B2* | 10/2014 | Chao et al. | 715/732 |
| 2004/0143590 A1* | 7/2004 | Wong et al. | 707/102 |
| 2005/0063613 A1 | 3/2005 | Casey et al. | |
| 2005/0192924 A1* | 9/2005 | Drucker et al. | 707/1 |
| 2006/0112408 A1* | 5/2006 | Crew | H04N 5/44543 725/45 |
| 2006/0140455 A1* | 6/2006 | Costache et al. | 382/118 |
| 2007/0270985 A1* | 11/2007 | Shellshear | G06F 3/0481 700/87 |
| 2008/0034381 A1* | 2/2008 | Jalon et al. | 719/329 |
| 2009/0067815 A1 | 3/2009 | Tsutsui | |
| 2009/0204920 A1* | 8/2009 | Beverley | G06T 3/4038 715/768 |

(Continued)

FOREIGN PATENT DOCUMENTS

| | | |
|---|---|---|
| CN | 1680939 | 10/2005 |
| EP | 1148412 A2 | 10/2001 |
| WO | 2010037591 A1 | 4/2010 |

OTHER PUBLICATIONS

International Search Report and Written Opinion, dated Mar. 28, 2013, for related PCT Application No. PCT/US2013/023007.

(Continued)

*Primary Examiner* — Tuyetlien T Tran

(57) ABSTRACT

Systems and methods for sequencing electronic files include generating a first file sequence and one or more alternative file sequences. An alternative file sequence may be generated based in part on a characteristic of a file in the first sequence. The first and alternative sequences may be used in an electronic slideshow that allows a user to switch between file sequences. In some implementations, which alternative file sequences are generated may be determined based in part on a prediction of characteristics that may be of interest to a user.

18 Claims, 4 Drawing Sheets

(56) References Cited

U.S. PATENT DOCUMENTS

| | | | |
|---|---|---|---|
| 2009/0307219 A1* | 12/2009 | Bennett | 707/6 |
| 2010/0011322 A1* | 1/2010 | Billmaier et al. | 715/830 |
| 2010/0042926 A1 | 2/2010 | Bull et al. | |
| 2010/0058388 A1* | 3/2010 | Baba et al. | 725/40 |
| 2010/0114891 A1 | 5/2010 | Oami | |
| 2011/0069085 A1 | 3/2011 | Weber et al. | |
| 2011/0087666 A1 | 4/2011 | Chou | |
| 2011/0251990 A1* | 10/2011 | Yarvis et al. | 706/52 |
| 2011/0273471 A1 | 11/2011 | Nagasaka et al. | |
| 2012/0030013 A1* | 2/2012 | Tsay et al. | 705/14.49 |
| 2012/0114257 A1* | 5/2012 | Fry | G06F 17/30256 382/224 |
| 2013/0104080 A1* | 4/2013 | Bosworth | G06Q 10/10 715/838 |

OTHER PUBLICATIONS

European Patent Office. Extended Search Report of European Patent Application No. 13741008.0, 8 pages. Jul. 28, 2015.
"Notification of First Office Action mailed in Chinese application No. 201380006515.6", Sep. 5, 2016.

* cited by examiner

SEQUENCING ELECTRONIC FILES

BACKGROUND

The present disclosure relates generally to sequencing electronic files. The present disclosure more specifically relates to generating multiple sequences of files based on the characteristics of a file, such as an image being displayed in a slideshow.

As users increasingly use electronic devices in their daily lives, the amount of data generated by users is also increasing. For example, many modern portable electronic devices (cellular telephones, music players, tablet computers, etc.) now include integrated camera functions. As a result, the number of digital images owned by a user may be much greater than in years past. In some systems, a user may organize their images into albums. For example, a user may create a folder in an operating system to store the images that they took during a vacation to Bermuda. In some systems, a user may create a slideshow to view the images in an album by defining a sequence in which the images are to be presented.

SUMMARY

Implementations of the systems and methods for sequencing electronic files are described herein. One implementation is a computerized method for sequencing electronic images. The method includes receiving, at a processing circuit, a request to view a slideshow of digital images having a characteristic specified by a user. The method also includes generating, by the processing circuit, a first sequence of images having the specified characteristic based in part on whether a user profile of the user has access to the images. The method further includes selecting, by the processing circuit, a focus image for the slideshow from the first sequence of images. The method additionally includes determining, by the processing circuit, a second characteristic of the focus image. The method further includes generating, by the processing circuit, a second sequence of images, the second sequence including the focus image and one or more images having the second characteristic of the focus image. The method yet also includes providing webpage data to an electronic device, the webpage data being configured to display the requested slideshow with the focus image. The slideshow is configured to display the focus image in a larger area of the slideshow than other displayed images, the slideshow also including a first graphical user interface input to change the displayed focus image to another image in the first sequence and a second graphical user interface input to change the displayed focus image to another image in the second sequence.

Another implementation is a system for sequencing electronic files. The system includes a processing circuit operable to generate a first sequence of files for a sequential display of the files, the first sequence of files including a focus file. The processing circuit is also operable to determine a characteristic of the focus file in the first sequence and to generate a second sequence of files having the characteristic. The processing circuit is further operable to provide display data to an electronic display, the display data being configured to display at least a portion of the contents of the focus file in the first sequence, an input configured to cause the display of at least a portion of the contents of another file in the first sequence, and an input configured to cause the display of at least a portion of the contents of another file in the second sequence.

A further implementation is a computerized method for sequencing electronic files. The method includes generating, by a processing circuit, a first sequence of files for a sequential display of the files, the first sequence of files including a focus file. The method also includes determining, by the processing circuit, a characteristic of the focus file in the first sequence. The method further includes generating a second sequence of files having the characteristic. The method additionally includes providing display data to an electronic display, the display data being configured to display at least a portion of the contents of the focus file in the first sequence, an input configured to cause the display of at least a portion of the contents of another file in the first sequence, and an input configured to cause the display at least a portion of the contents of another file in the second sequence.

These implementations are mentioned not to limit or define the scope of this disclosure, but to provide examples of implementations to aid in the understanding thereof.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, electronic files may be presented on an electronic display across multiple sequences, allowing a user to seamlessly switch between sequences. In some implementations, the sequences may be used as part of a slideshow that displays electronic files in the sequences. For example, a user may use a slideshow to view an image of a boat in a first sequence of images taken during their recent trip to Bermuda. Based on the characteristics of the image (e.g., metadata associated with the image, the content of the image, etc.), other sequences of images may also be generated. For example, a second sequence of images may be generated devoted to images of boats and presented as part of the slideshow. The user may then opt to continue viewing images in the first sequence (e.g., images from their trip to Bermuda) or images in the second sequence (e.g., images of boats).

In various implementations, any number of different file sequences may be presented to a user via a graphical user interface (GUI), based on the characteristics of a file in the current sequence. For example, a user may be presented with one, two, three, or more alternative file sequences. In some implementations, the number of alternative sequences may be preset by the user via a stored user preference. Similarly, which alternative sequences are generated and presented may be based on a user preference or may be automatically selected by the system without receiving input from the user.

For example, the user may specify an order of preference for alternative sequences, such as "wedding photos," "puppies," and "sunsets." In another example, the system may select alternative sequences based on characteristics predicted by the system to be of interest to the user (e.g., based on previous sequences selected by the user, based on the user's social networking groups, based on user profile data about the user, etc.).

Figure 1:
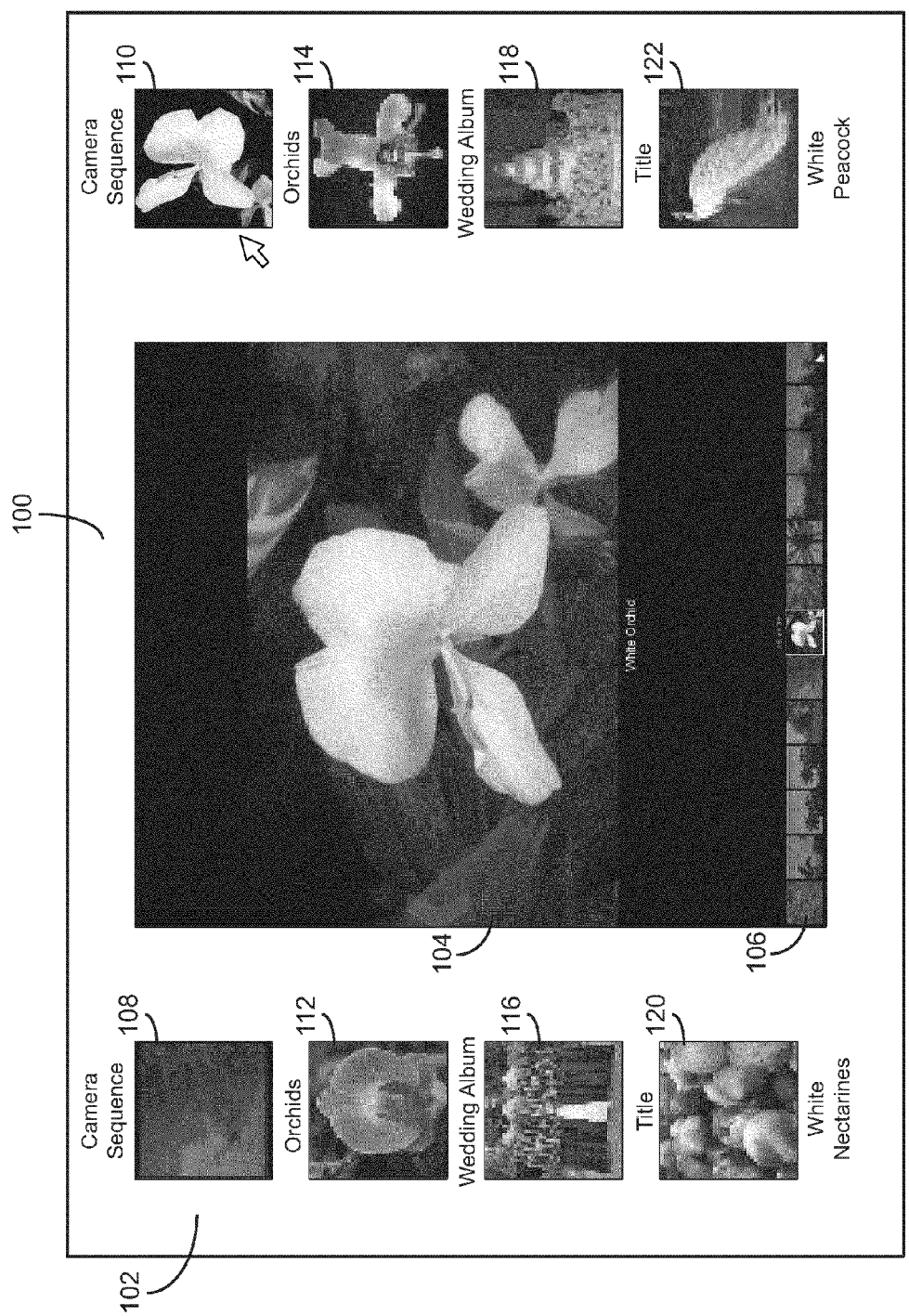
FIG. 1 is an illustration of a digital slideshow, according to one implementation.

Referring to FIG. 1, an illustration of a digital slideshow 102 is shown, according to some implementations. Slideshow 102 may be provided on one or more electronic displays, such as display 100. Display 100 may be any form of electronic display configured to provide visual data to a user. For example, display 100 may be a liquid crystal display (LCD), light emitting diode (LED) display, plasma display panel (PDP), cathode ray tube (CRT) display, electronic paper, a combination thereof, or any other form of display configured to receive display data and to visually present data to a user. Display 100 may be located within the housing of the device that provides display data to display 100 or may be located externally, according to various implementations. For example, display 100 may be a display integrated into an electronic device (e.g., a display of a laptop computer, a tablet computer, a cellular telephone, a portable digital assistant, a smart television set, a camera, etc.) or may be a stand-alone display (e.g., a computer monitor, a television, etc.).

The display data that causes slideshow 102 to be displayed by display 100 may be provided by one or more processors that execute instructions stored in one or more electronic memories (i.e., provided by a processing circuit). For example, slideshow 102 may be part of a slideshow application. In another example, slideshow 102 may be part of a webpage. That is, slideshow 102 may be executed within a web browser application. In various implementations, some or all of the data presented as part of slideshow 102 may be stored locally in a memory or may be received via a network from a remote device. For example, some of the images presented as part of slideshow 102 may be stored locally in the memory of a mobile telephone, while other images may be received from a server via the Internet (e.g., from a server of a social networking system, from an image hosting service, etc.).

One or more focus images may be displayed as part of slideshow 102. In general, a focus image may be the current image in a sequence of images being displayed in slideshow 102. In one implementation, images that are not focus images may be displayed as thumbnails in slideshow 102. As shown, an image 104 may be the focus image for a sequence 106 of images. In one example, sequence 106 may correspond to all images taken by a particular camera and sorted in chronological order, i.e., a "camera sequence." Sequence 106 may include any number of images ordered prior to, or after, that of image 104 in sequence 106. For example, image 104 may be preceded by image 108 in sequence 106 (e.g., image 108 was captured prior to that of image 104). Similarly, image 104 may be followed by image 110 in sequence 106 (e.g., image 110 was taken directly after that of image 104). Sequence 106 may be specified by a user or may be automatically generated by the system without input from a user. For example, the user may specify that they wish to view all images captured by a camera in chronological order. In another example, slideshow 102 may default to show all images in chronological order.

According to various implementations, one or more alternative or supplemental image sequences may be presented as part of slideshow 102 based on the characteristics of image 104. For example, slideshow 102 may include three alternative sequences, in addition to that of sequence 106: a sequence based on the topic, "orchids," a sequence based on images located within a "wedding album," and a sequence based on the "title" of an image. An alternative image sequence corresponds to a set of images that differs from those in the primary sequence. In some cases, the alternative image sequence may include the one or more focus images, allowing a user to pivot between image sequences related to different image characteristics. For example, image 104 may be part of sequence 106 that orders images from a camera chronologically. However, image 104 may also be part of a second sequence devoted to the topic of "orchids," since image 104 contains an image of an orchid (e.g., image 104 may be preceded by an image 112 of an orchid and followed by an image 114 of an orchid in the sequence). Image 104 may also be part of a third sequence of images flagged as part of a "wedding album" (e.g., image 104 may be preceded by an image 116 and followed by an image 118), since image 104 was taken at a wedding. In an exemplary fourth sequence, image 104 may be preceded by an image 120 and followed by an image 122 based on the titles of the images or keywords in the metadata of the images. For example, if image 104 is titled, "White Orchid," it may be preceded by image 120, titled "White Nectarines," and followed by image 122, titled "White Peacock."

Alternative image sequences allow a user to seamlessly transition from one set of images to another. In contrast to a traditional slideshow where the order in which images are presented is fixed, slideshow 102 allows the order of presentation to be dynamic. In other words, a user may switch from one image sequence to another while viewing images within slideshow 102.

According to various implementations, slideshow 102 may be associated with a user profile. Such implementations allow for greater control over slideshow 102, such as how slideshow 102 is configured or what information is displayed as part of slideshow 102. In some cases, a user may log into their profile while starting slideshow 102. In another case, the user may be automatically logged into their profile based on stored credentials (e.g., a stored user name and password) or based on a device ID. For example, the user may be automatically logged into their profile on a remote server based on the device ID of their mobile telephone.

In cases in which a user profile is utilized, various configurations may be associated with the user profile that control how slideshow 102 is presented. In one implementation, the user profile may have associated user preferences. For example, a user may specify which image sequences are displayed via slideshow 102 (e.g., the user may have specified a preference for images of orchids). In some implementations, which sequences have been selected by the user in the past may be associated with their profile and used to determine which alternative sequences are presented via slideshow 102. For example, if the user of slideshow 102 had previously selected sequences devoted to "orchids," slideshow 102 may include such a sequence based on image 104.

In some implementations, a user profile may be used to gain access to the images displayed by slideshow 102. In one example, a user may create one or more photo albums and slideshow 102 may be used to review the images (e.g., within an album or across multiple albums owned by the user). In another example, some or all of the images displayed by slideshow 102 may be owned by a different user that has granted access to the profile of the user viewing slideshow 102.

According to various implementations, slideshow 102 may include any number of different GUI effects. In some implementations, a focus image may be presented as part of a lightbox effect that dims the background behind the focus image, such as image 104. In one implementation, slideshow 102 may be configured to utilize a hover-over effect (e.g., by performing an action in response to a cursor being positioned above a certain area of slideshow 102). For example, positioning a cursor over a previous or subsequent image in a sequence (e.g., over images 108, 110, 112, 114, 116, 118, 120, or 122) may cause more information about the sequence to be displayed via slideshow 102. In one implementation, the characteristic used to generate the sequence may be displayed. For example, positioning a cursor over image 114 may cause the topic, "orchids" to be displayed. In one implementation, additional images in the sequence may be displayed via a hover-over event. For example, positioning a cursor over image 110 may cause additional images in sequence 106 to be displayed on a portion of slideshow 102 (e.g., on the bottom of slideshow 102 as shown in FIG. 1, on the top of slideshow 102, etc.).

Selection of a previous or subsequent image in a sequence via slideshow 102 may cause the selected image to be displayed as the focus image. For example, selection of image 122 may cause image 104 to be replaced on display 100 with image 122. In addition, selection of a previous or subsequent image in a sequence may cause one or more other sequences to be generated, based on the characteristics of the selected image. For example, selection of image 122 may cause an alternative image sequence related to the topic of "birds" to be generated based on image 122 showing a peacock. In such a case, previous and/or subsequent images in the "birds" sequence may replace images 112 and 114 on slideshow 102.

In some implementations, multiple sequences may be selected at the same time. For example, a touchscreen display may allow the selection of images 114 and 118 at the same time. Selection of multiple sequences may cause a superset of images to be generated (e.g., containing the files of both sequences) or may cause a sequence of images having both characteristics to be generated. In one implementation, the sequence that is generated from selecting multiple sequences may be displayed on slideshow 102 (e.g., in the place of sequence 106 or in another area on display 100).

While slideshow 102 is shown in FIG. 1 with reference to digital images, it is to be appreciated that any number of different types of electronic files may be presented via slideshow 102. Non-limiting examples of electronic files that may be displayed via slideshow 102 include text files, spreadsheets, movie files, music files, or a combination of different types of files. For example, a spreadsheet located in a user's "home finance" collection may be displayed via slideshow 102. In such a case, possible sequences of files include other files in the user's collection, other files about home finance, files ordered by last modification time, or shared documents among a set of collaborators.

Figure 2:
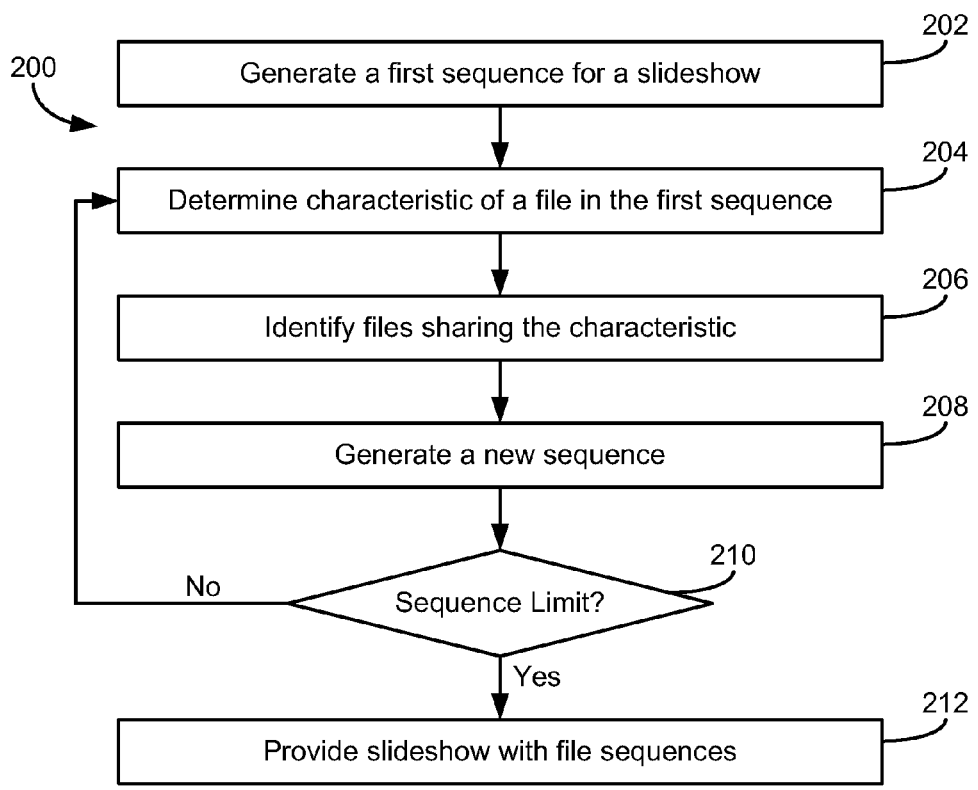
FIG. 2 is an example process for sequencing electronic files.

FIG. 2 is an example process 200 for sequencing electronic files. Process 200 may be implemented by a user electronic device or by a server, according to various implementations. For example, process 200 may be implemented by a user's home computer or may be implemented by a web server that provides a slideshow as part of a webpage to the home computer. In some implementations, process 200 may be implemented by a combination of devices.

Process 200 includes generating a first sequence of files for a slideshow (block 202). In one implementation, a sequence of files may be generated based on one or more criteria selected by a user. A selected criterion used to generate the first sequence may be any characteristic of an electronic document. For example, the name of the file, the size of the file, when the file was created, when the file was modified, and/or the owner of the file may be used to generate a sequence. In some implementations, additional information may be associated with a file, such as metadata or data stored as part of the file's format. For example, the exchangeable image file format (Exif) may include date and time information for an image, camera settings used to capture the image (e.g., the make and model of the camera, the shutter speed, focal length, ISO speed, metering mode, orientation, etc.), information about where the image was captured, or other information about the image. In some implementations, the additional information may be associated with a social networking action (e.g., comments, ratings, suggestions, etc.). For example, a user may comment about an image, "Wow. There are some beautiful flowers at the Botanical Garden!" In such a case, the topics "flowers" and "Botanical Garden" may be extracted from the comment and associated as a characteristic of the image. In some implementations, the criteria selected by the user may be stored as a user preference to control which sequence is first presented by the slideshow.

In some implementations, the first sequence may be generated automatically without input from the user. In one case, the first sequence may be generated automatically based on a characteristic of a file already presented via the slideshow. For example, the first sequence of process 200 may be an alternative sequence presented in the slideshow based on a characteristic of a document of focus. In another case, the first sequence may be generated automatically based on other information associated with a user profile (e.g., the user's demographics, social connections, Internet search history, etc.). For example, if the user's profile belongs to a social networking group devoted to quilting, files related to the topic of "quilting" may be automatically included in the generated sequence of files.

In some implementations, a characteristic of a file may include the content of the file itself. For example, a text file of an article about baseball may be parsed to associate the topic of "baseball" with the file. In another example, image recognition may be used to identify a person, object, or location in an image. For example, persons A, B, and C may be identified in an image. In such a case, person A, B, and/or C may be used as a characteristic to generate sequences. For example, a sequence may include other images that also show person A. In a further example, a term frequency-inverse document frequency (TF-IDF) weight may be used to determine topics present in text files, spreadsheets, or other documents containing text.

In further implementations, the first sequence for the slideshow may be wholly defined by the user. For example, a user may manually specify a custom order in which files are to appear. Files in a custom sequence may or may not share characteristics. For example, a user may like five unrelated images and order the images to generate a first sequence for a slideshow. In another example, some or all of the images may share common characteristics, such as where the images were taken.

In some implementations, a sequence may be linear, i.e., one file has no previous file in the sequence and another file has no subsequent file in the sequence. In other implementations, the sequence may be continuous. For example, a sequence that includes files A, B, C may transition from files A→B=C→A or vice-versa.

Process 200 includes determining a characteristic of a file in the first sequence (block 204). In some implementations, the file in the sequence may correspond to a file being focused on by a slideshow (e.g., displayed in larger proportion than that of other files, centered on the display screen or window, etc.). For example, characteristics of image 104 shown in FIG. 1 may be determined. In some implementations, the characteristic may be determined for another file in the first sequence. The characteristic may be any data in the file (e.g., the content of the file) or associated with the file (e.g., metadata, data in a social networking system, etc.), in various implementations.

Process 200 includes identifying files sharing the determined characteristic (block 206). Files sharing the determined characteristic may be stored with the file in the sequence or may be stored in a separate location. For example, the identified files may be part of the same album owned by a particular user, part of differing albums owned by the same user, or part of albums owned by different users. In some cases, the identified files may be stored in different devices (e.g., one file is stored in a local device and another file is store by a remote device). In some implementations, the files may be of differing types. For example, one file in the sequence may be an image of a penguin. In such a case, a text file containing a short story about the exploits of a penguin may be identified as also being devoted to the topic of penguins.

Process 200 includes generating a new sequence containing some or all of the identified files sharing the characteristic (block 208). In some implementations, the slideshow may limit the number of files in a given sequence (e.g., based on a user preference, a hardcoded limit in the slideshow, etc.). For example, the slideshow may identify seventy files that share the characteristic, but only use fifty of the identified files to generate a new sequence. According to various implementations, the order in which files appear in the sequence may be based on the order in which the files were identified, the relationship between the identified file and the file in the first sequence (e.g., located in the same folder, created around the same time, etc.), how strongly the characteristic applies to the file, etc. For example, an article that is entirely devoted to the topic of penguins may have the characteristic more strongly than that of an article that briefly mentions penguins. In another example, an image in the same folder or album as that of the file in first sequence may receive a higher priority in the generated sequence than that of a file shared by another user.

In some implementations, the file in the first sequence may be included in the new sequence. In such a case, the position of the file in the new sequence may vary, depending on whether the sequence is linear or continuous. If the sequence is continuous, for example, the files may be ordered in both the preceding and subsequent directions from the file of the first sequence (e.g., the images immediately preceding and subsequent to the focus image may be the two images that most strongly match the characteristic, the images are the most related to the focus image, etc.). If the sequence is linear, the file from the first sequence may be positioned anywhere in the new sequence (e.g., at the start of the new sequence, at the end of the new sequence, at the median position in the new sequence, etc.).

Process 200 may optionally include determining whether a sequence limit has been reached (block 210). In some implementations, multiple alternative sequences may be generated based on an image in the first sequence. For example, a file in the first sequence may be an image of "John Doe" standing in front of the Eiffel Tower and taken on Jul. 4, 2001. In such a case, possible alternative sequences include images of John Doe, images of France, and images taken around Jul. 4, 2011. The number of alternative sequences generated in process 200 may be based on a sequence limit specified in a user preference or hardcoded, in various implementations. For example, three alternative sequences may be generated, even though fifteen possible sequences may be generated (e.g., the file in the first sequence has fifteen identifiable characteristics that may be used to generate alternative sequences).

In some implementations, which characteristics are used to generate alternative sequences may be based on a user preference or may be automatically selected without further input from the user. For example, the user may specify an order of preference for which types of alternative sequences are generated first for the slideshow. In one implementation, characteristics that may be of interest to a user may be determined and used to generate the alternative sequences. For example, a user may often select to view sequences that contain images of flowers, but never select to view sequences that contain images of clowns. In such a case, the topical characteristic of "flowers" may receive a higher priority than that of "clowns." In other words, if the file in the first sequence is related to the topic of flowers, a sequence of files related to flowers may be generated before that of clowns.

If a sequence limit has not yet been reached, other characteristics may be determined and used to generate additional sequences (e.g., by repeating the processing of blocks 204, 206, 208). For example, if the sequence limit is four, four characteristics of the file in the first sequence may be determined and used to generate four alternative sequences. In some implementations, the processing of blocks 204, 206, 208 may be combined. In one example, all characteristics for the file in the first sequence may be determined at the same time, ordered, and used to generate new sequences up to the sequence limit.

Process 200 includes providing a slideshow with the file sequences (block 212). The slideshow may be provided to an electronic display or to a device having an electronic display, in various implementations. In some cases, the file sequences may be determined by a server and provided to client device operated by a user. For example, the server may provide the slideshow with the sequences as part of a webpage to the client device. In another example, the sequences and/or the files of the sequences may be provided to the client device (e.g., the slideshow may be an application executed locally that receives the determined sequences from the server). In some cases, the sequences may be determined by the same device that executes the slideshow.

Figure 3:
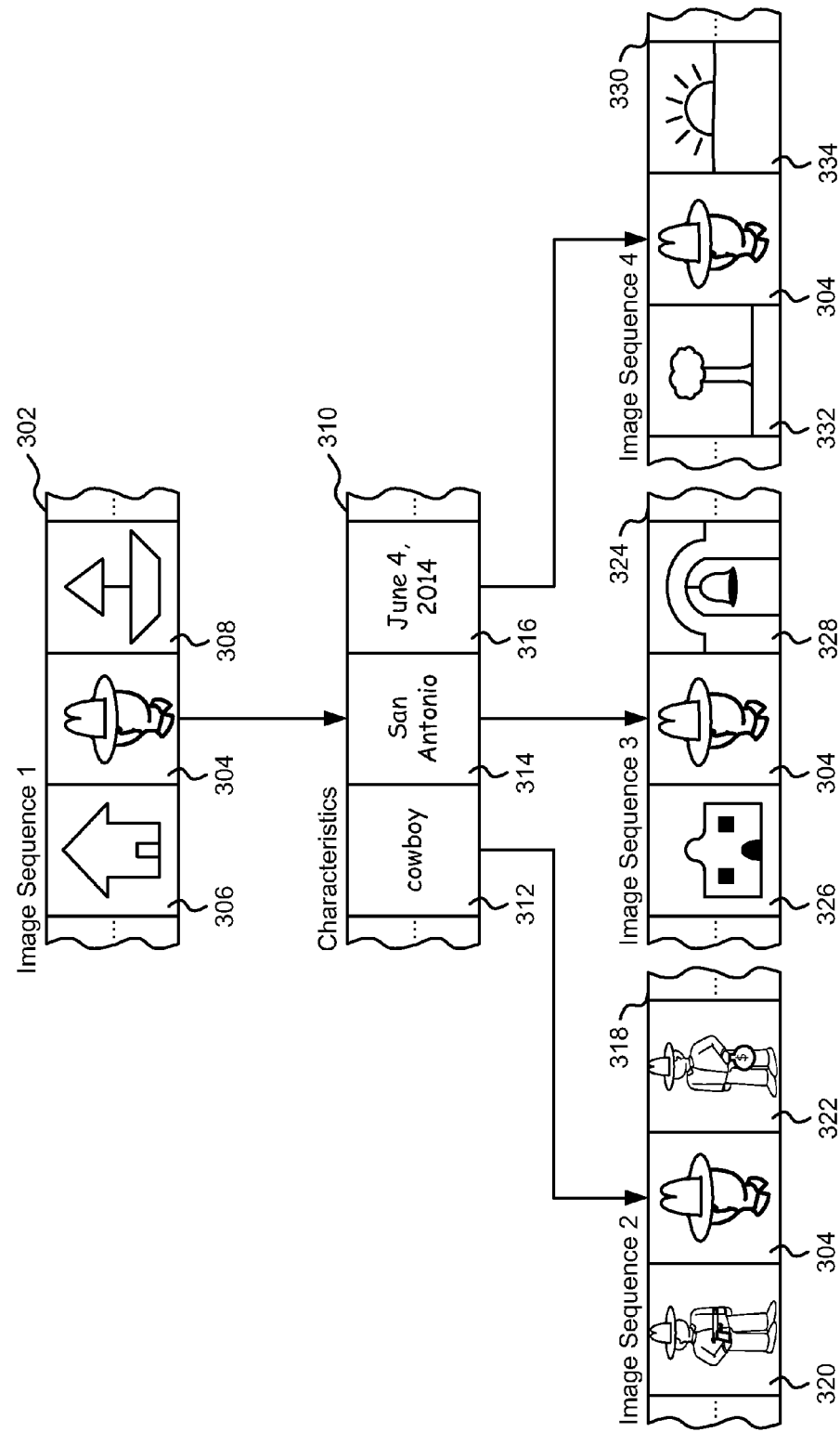
FIG. 3 is an illustration of image sequences being generated.

FIG. 3 is an illustration of image sequences being generated, according to one example. A first image sequence 302 may include any number of images, including image 304. Image 304 is preceded in image sequence 302 by image 306 and followed by image 308. In some implementations, image 304 may be a focus image in a slideshow (e.g., the slideshow emphasizes image 304 on the display and allows a user to navigate to images 306, 308 as the next focus image).

Image sequence 302 may be generated using any number of criteria to select and order the images. In one implementation, the images in image sequence 302 may be located in the same memory location or photo album. For example, image sequence 302 may contain images that are in a photo album of a user devoted to the user's latest vacation. In some implementations, the images in image sequence 302 may be selected based on one or more other characteristics of the images (e.g., metadata associated with the images, the content of the images, etc.). For example, the images in image sequence 302 may be selected based on the images being taken by the same camera. The number of images in image sequence 302 may be limited to a certain number of images, in some cases. For example, image sequence 302 may contain the first fifty images that match the selection criteria. In another example, image sequence 302 may include those images that most closely match the criteria. For example, if the selection criteria is a specific creation date or time, image sequence 302 may contain those images that were taken closest temporally to the specified date or time.

Image sequence 302 may be sequenced based on the order in which the images are identified or may be ordered based on how strongly the images match the selection criteria. For example, image sequence 302 may contain the first fifty image files found in a given folder. In another example, image sequence 302 may be ordered based on how well the images match the topic "sunny days." In some implementations, the first focus image in a slideshow may be selected based on how well the image matches the selection criteria. For example, image 304 of image sequence 302 may be selected as the first focus image for a slide show because it was taken closest to a specified date or time. In some implementations, the ordering of a sequence may be made relative to the file that most closely matches the selection criteria. For example, image 304 may be the image that most closely matches that of the selection criteria, followed by images 306, 308 (e.g., the most relevant images may be positioned in image sequence 302 in alternating positions before and after the focus image).

In some implementations, the criteria used to generate image sequence 302 may be specified by a user. For example, a user may manually specify that image sequence 302 is to contain images relating to a certain event, such as a friend's wedding. The user may specify the criteria when the slideshow is running or may save the criteria as a user preference. For example, image sequence 302 may be automatically generated (e.g., without further input from the user) based on selection criteria stored as a user preference. In some implementations, image sequence 302 may be generated without the user specifying the selection criteria for the sequence. For example, the sequence may be automatically generated based on which image sequences were previously selected by the user, based on criteria from the user's social networking profile (e.g., ratings by the user, comments by the user, groups to which the user belongs, etc.), or a user's Internet search requests. In some implementations, the images in image sequence 302 and/or their ordering may be manually specified by a user. For example, a user (e.g., a user viewing the slideshow, a user that owns the images, etc.) may specify that images 304, 306, 308 are to be included in image sequence 302 and their ordering in image sequence 302.

Characteristics of image 304 in image sequence 302 may be used to generate alternative image sequences, such as image sequences 318, 324, 330. The characteristics of an image may include the location of the image, the content of the image, and/or metadata associated with the image. For example, image 304 of image sequence 302 may have characteristics 310. Characteristics 310 may include any number of characteristics of image 304, such as characteristics 312, 314, 316.

In one example, characteristic 312 may relate to the content of image 304 (e.g., that image 304 contains an image of a cowboy). In some implementations, the content of an image may be determined using image recognition. For example, image 304 may be compared to other images of cowboys to determine that image 304 also has an image of a cowboy. In some implementations, the content of image 304 may be user-specified. For example, a user may tag image 304 as including an image of a cowboy. In another example, the content of image 304 may be determined based in part on a comment about image 304. For example, a user of a social networking system may comment on image 304, "Wow. Great picture of a cowboy!" Such a comment may be analyzed to determine that image 304 contains an image of a cowboy.

In another example, characteristic 314 may relate to the physical location at which image 304 was taken (e.g., that image 304 was taken in San Antonio, Texas). The location at which an image was taken may be user-specified or may be associated with the image without user input. For example, the device capturing image 304 may employ a location determining mechanism, such as cellular triangulation, a global positioning system, or the like, to associate location information as metadata with image 304. In another example, the location may be determined based on a user-specified tag, a comment about image 304 in a social networking system, the album or folder in which image 304 is located (e.g., an album titled "Pics from San Antonio"), or inferred based on other images (e.g., image 304 was taken one minute prior to image 304 and has metadata specifying that image 304 was taken in San Antonio, Texas).

In a further example, characteristic 316 may relate to a timestamp corresponding to when image 304 was taken (e.g., that image 304 was captured on Jun. 4, 2014). In one implementation, the timestamp may be stored automatically (e.g., without input from a user). For example, the device that captures image 304 may store a timestamp as metadata corresponding to when image 304 was captured. Timestamp information may include date information, time information, or a combination thereof.

Characteristic 312 may be used to generate an alternative image sequence 318. For example, image sequence 318 may contain other images of cowboys based in part on image 304 containing an image of a cowboy. In some implementations, image 304 may be included in image sequence 318. In some cases, image 304 may be the focus image in the slideshow. Similar to image sequence 302, the images in image sequence 318 may be selected and/or ordered based on how well an image matches characteristic 312, in one implementation. For example, images 320 and 322 may precede and follow image 304 based on how well they match the topic of cowboys.

Similar to image sequence 318, image sequences 324, 330 may be generated based in part on characteristics 314, 316, respectively. For example, image 304 in image sequence 324 may be preceded and followed by other images related to the topic of San Antonio (e.g., images 326, 328). Image 304 in image sequence 324 may be preceded and followed by other images also captured on Jun. 4, 2014 (e.g., images 332, 334).

According to various implementations, alternative image sequences may be used in a slideshow to allow a user to navigate from a focus image in one sequence to another image in a related sequence. For example, image 304 may be the current focus image in a slideshow application. The user may be able to navigate forward or backwards within the current image sequence (e.g., to image 306 or image 308 in image sequence 302). Navigating to another image may cause that image to become the new focus image in the slideshow, according to some implementations. However, the user may also be able to navigate forwards or backwards in image sequences 318, 324, 330, as well. For example, the user may opt to begin viewing other images relating to cowboys by navigating to image 320 or image 322.

In one implementation, which of characteristics 310 are used to generate alternative image sequences may be based on a user preference. For example, a user may specify an order of preference for characteristics used to generate alternative image sequences. In one implementation, which of characteristics 310 are used to generate alterative image sequences may be based on inferred user preferences (e.g., characteristics not specified by a user and predicted by the system to be of interest to the user). For example, if the user often selects to switch to an image sequence that contains images of cowboys, characteristic 312 may be used to generate image sequence 318 over that of other characteristics in characteristics 310. In various implementations, the number of alternative image sequences may be controlled by a user preference or may be hardcoded. For example, a user may specify that a total of four image sequences should be presented as part of a slideshow. In another example, the slideshow may be configured to limit the number of displayed image sequences to a maximum of four.

Figure 4:
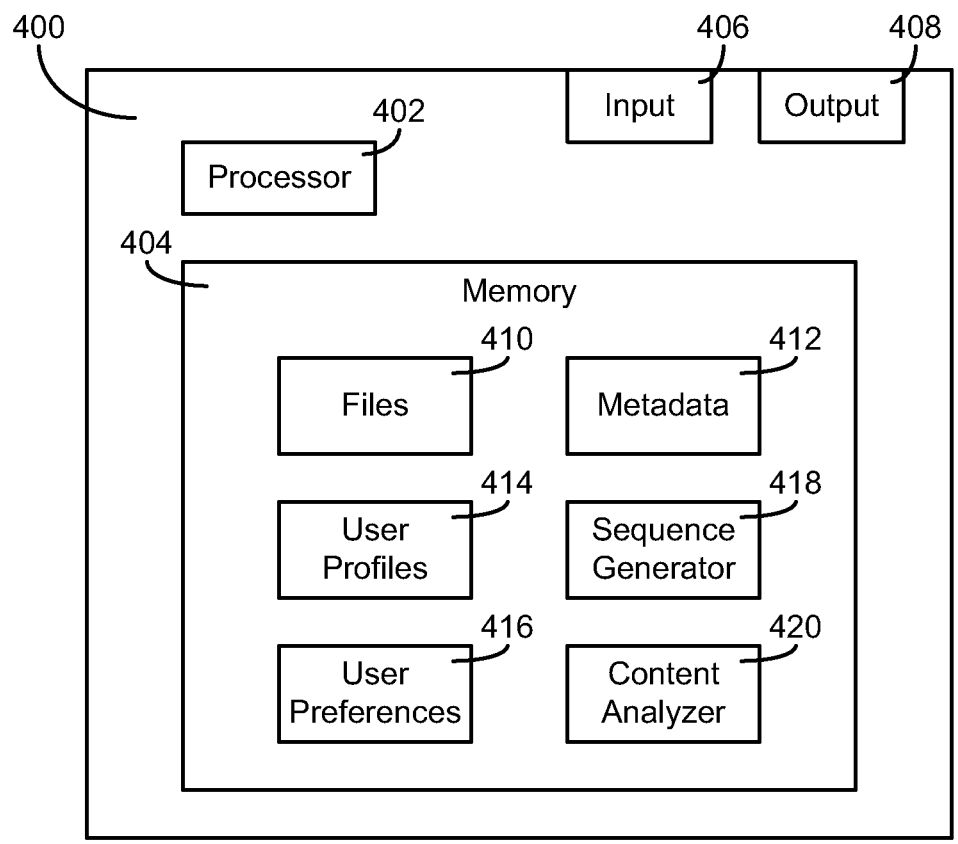
FIG. 4 is a block diagram of an exemplary processing circuit configured to determine a sequence in which to present electronic files.

Referring to FIG. 4, a detailed block diagram of processing circuit 400 is shown. Processing circuit 400 may be within, for example, a user electronic device, a web server, or another electronic computing device. Processing circuit 400 includes processor 402 and memory 404. Processor 402 may be, or include, one or more microprocessors, an application specific integrated circuit (ASIC), a circuit containing one or more processing components, a group of distributed processing components, circuitry for supporting a microprocessor, or other hardware configured for processing. Processor 402 is also configured to execute computer code stored in memory 404 to complete and facilitate the activities described herein. Memory 404 can be any computer-readable medium capable of storing data or computer code relating to the activities described herein. For example, memory 404 is shown to include sequence generator 418, which may be implemented using computer code (e.g., executable code, object code, source code, script code, machine code, etc.) configured for execution by processor 402. When executed by processor 402, processing circuit 400 is configured to complete the activities described herein.

Processing circuit may also include hardware circuitry for supporting the execution of the computer code sequence generator 418. For example, processing circuit 400 may include hardware interfaces for communicating with other computing devices (e.g., another server, a client device, etc.). Processing circuit 400 may include an input 406 for receiving requests for data from processing circuit 400 and for receiving data requested by processing circuit 400 from other devices. Processing circuit 400 may also include an output 408 for providing requests for data to other electronic devices and for providing requested data to other devices. For example, processing circuit 400 may request an electronic file and/or metadata about the file from one or more other computing devices (e.g., a content source, a server, etc.) via output 408. In response, processing circuit 400 may receive the requested data and store it in memory 404 in files 410 and/or metadata 412. In some implementations, input 406 may receive input from a user interface device (e.g., a keypad, a keyboard, a pointing device, a touch-activated device, a microphone, etc.) and output 408 may provide data to a user interface device (e.g., an electronic display, a speaker, etc.). For example, processing circuit 400 may receive one or more user-specified preferences via input 406 and store them in memory 404 as user preferences 416.

Files 410 may include one or more electronic files, such as digital images, files that contain text, spreadsheets, movies, audio files, webpages, or the like. In some implementations, files 410 may be stored using a directory structure of an operating system. For example, files 410 may be stored in one or more hierarchical folders (e.g., images may be stored in the directory, /home/user/pics/vacation). In some implementations, files 410 may be grouped within an application, regardless of their directory location. For example, an album of cowboy images may include the images /home/user/pics/vacation/Texas_Cowboy.jpg and /home/user/pics/rodeo/Cowboy1.gif, which are stored in different directories. In some implementations, files 410 may store the location of a file, instead of the actual file. For example, files 410 may include a universal resource locator (URL) or other network address at which a file is located.

Files 410 may have associated metadata 412, which may be stored as part of a file in files 410 or separately in memory 404, according to various implementations. For example, a file in files 410 using the Exif format may include an image as well as metadata pertaining to the image. Metadata 412 may include one or more files associated with a file in files 410, in addition to, or in lieu of, the file itself containing metadata. For example, an image in files 410 in Exif format may still have one or more associated files in metadata 412 that include additional information about the image (e.g., one or more topics based on the content of the image, comments about the image in a social networking system, etc.). Metadata 412 may include, but is not limited to, information about the contents of a file (e.g., a topic related to the file, a person identified in an image or movie, etc.), when the file was created, where the file was created, a title of a file, the owner of the file, social networking information (e.g., which user have access to the file, which users rated the file, which users commented on the file, which users are socially connected to the owner of the file, etc.), when the file was uploaded to memory 404, the device that uploaded the file to memory 404, when the file was last modified, the user that last modified the file, the memory location of the file, an album or other group of files to which the file belongs, the size of the file, or the device that created the file.

In some implementations, memory 404 may include user profiles 414. User profiles 414 may be used to control access to files 410, determine metadata 412, and/or tailor the operation of the system to a particular user (e.g., by associating preferences stored in user preferences 416 with a user profile). In one implementation, user profiles 414 may be user profiles for a social networking system. In such a case, a user may associate their profile with one or more other user profiles (e.g., the user may specify which other users of the system are social connections). A file in files 410 may be associated with a user profile in user profiles 414, allowing the user to control how files 410 are presented (e.g., which users have access to the file, whether other users are able to modify the file, etc.). In some cases, a user profile may include information about the user's demographics or interests. For example, a user may associate their profile with an interest group devoted to horticulture.

In cases in which memory 404 includes user profiles 414, memory 404 may also include user preferences 416. User preferences 416 are used to control the operation of processing circuit 400. User preferences 416 may include one or more data values that cause processing circuit 400 to operate differently, depending on the data values. In various implementations, user preferences 416 may include data values that control how many sequences are generated by sequence generator 418, which of user profiles 414 are able to access a file in files 410, and/or whether sequences are to be generated using user-specified file characteristics or automatically determined characteristics (e.g., without input from the user). Further examples of user preferences 416 include values that control whether a generated sequence contains only files of a certain type (e.g., only image files, only text files, etc.), whether sequences are to be continuous or linear, how files are to be ordered in a sequence (e.g., based on relevance to a file characteristic, based on the order in which the files are identified, etc.), and/or whether sequence generator 418 is to even generate an alternative file sequence.

Memory 404 includes sequence generator 418, which is configured to generate one or more file sequences containing files from files 410. According to various implementations, sequence generator 418 may be part of an application that provides a slideshow to an electronic display. For example, sequence generator 418 may be part of a stand-alone slideshow application, part of a webserver application that provides a slideshow webpage via output 408, or may be part of a remote service that provides file sequences to another device running a stand-alone slideshow application.

In some implementations, sequence generator 418 may generate a first file sequence containing some or all of files 410. The first file sequence may be based on one or more characteristics of files 410 (e.g., metadata 412 and other data related to files 410). In some implementations, a characteristic used by sequence generator 418 to generate a sequence may be specified by a user during execution of a slideshow and/or stored in user preferences 416. For example, a user may specify via user preferences 416 that they always want images of cats in files 410 to appear as a first sequence in a slideshow. In other implementations, the first file sequence may be determined by sequence generator 418 without user input and based on an inferred characteristic of interest for the user. For example, if a profile in user profiles 414 belongs to a social networking group devoted to funny pictures of cats, sequence generator 418 may use this information to generate a first file sequence devoted to cats. In further implementations, the files in the first file sequence and/or the order in which they appear may be entirely specified by a user.

In implementations in which sequence generator 418 is used to generate file sequences for a slideshow, sequence generator 418 may identify one or more files in the first sequence as being files of focus. In general, a file of focus in a slideshow is a file that is emphasized in the slideshow (e.g., by positioning the file in a prominent location, by displaying the file in a larger area of the screen than that of other files, etc.). For example, an image of focus in a slideshow may be displayed in full size, as opposed to other images being displayed as thumbnails. In other words, at least a portion of the contents of a file of focus may be prominently displayed in the slideshow.

Sequence generator 418 may generate any number of alternative file sequences, in addition to generating a first file sequence. In some implementations, sequence generator 418 may generate an alternative file sequence based on one or more characteristics of a file in the first file sequence (e.g., the file of focus or another file). Similar to the first file sequence, the file characteristics used to generate an alternative file sequence may be based on user preferences 416 or inferred by sequence generator 418 based on information about user profiles 414 (e.g., a user's potential interests, a user's search requests, a user's social connections, etc.). For example, a first file sequence may include those of files 410 that were created on Aug. 11, 2012 and have a focus file that is an image of a woman standing in front of the Leaning Tower of Pisa. Accordingly, sequence generator 418 may generate alternative file sequences that contain those of files 410 related to Italy, the Leaning Tower of Pisa, the woman in the image, or were created around Aug. 11, 2012.

In some implementations, memory 404 may include content analyzer 420, which is configured to identify characteristics of files in files 410 based on their contents. In some implementations, content analyzer 420 may utilize image recognition to identify a person, place, or object in an image file. For example, content analyzer 420 may use facial recognition to identify a person in an image as a characteristic of the image. Sequence generator 418 may use content analyzer 420 to identify other images that show the same person and generate a sequence of images of that person. In some implementation, content analyzer 420 may parse text in a file of files 410 to identify a topic discussed in the file. Content analyzer 420 may use any form of text mining technique to determine a topic of a text file (e.g., TF-IDF weighting or the like). In some implementations, content analyzer 420 may be configured to infer the content of a file based on metadata 412 and/or other files in files 410. For example, content analyzer 420 may base its determination on a comment associated with a file, a topic associated with other files located in the same directory or album as the file, etc. In some implementations, file characteristics identified by content analyzer 420 may be stored in metadata 412 and associated with the file.

In one example, processing circuit 400 may be configured to serve a webpage that includes a slideshow. Processing circuit 400 may receive a login request from a remote device via input 406 to log into a profile in user profiles 414. In response to receiving a subsequent request to view a slideshow, processing circuit 400 may generate webpage data that causes a slideshow to be displayed on an electronic display of the requesting device. The slideshow may include one or more of files 410 that are selected and ordered in a first file sequence generated by sequence generator 418. The first file sequence may include a file of focus for the slideshow. Sequence generator 418 may use characteristics of the file of focus to generate alternative file sequences for the slideshow. The webpage data provided to the remote device via output 408 may include one or more GUI inputs to enable the user to switch between different file sequences (e.g., buttons to go forward or backward in a sequence). If an alternative file sequence is selected, a file in the alternative sequence may become the file of focus. In response, processing circuit 400 may determine new alternative file sequences, based on the characteristics of the new file of focus in the slideshow.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an opensocial networking system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a USB flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending websites to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a GUI or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system for sequencing electronic files comprising a processing circuit operable to:

generate a first sequence of files for a sequential display of the files, the first sequence of files including a focus file;

determine at least two characteristics of the focus file;

generate a first group of at least two alternative sequences of different sets of files, each alternative sequence of the first group being based on a corresponding one of the at least two characteristics of the focus file, wherein at least one of the at least two alternative sequences includes one or more files not present in the first sequence, and wherein the focus file is a part of the at least two alternative sequences of files of the first group;

provide first display data to an electronic display, the first display data configured to display in a first view, at least a portion of the first sequence and at least a portion of the at least two alternative sequences of the first group;

receive a selection of a second focus file from one of the at least two alternative sequences of the first group;

determine a characteristic of the second focus file;

generate a second group of at least one alternative sequence of files based on the characteristic of the second focus file; and provide second display data to the electronic display, the second display data configured to display in a second view, at least a portion of the second group of the at least one alternative sequence of files.

2. The system of claim 1, wherein the focus file in the first sequence comprises a digital image.

3. The system of claim 1, wherein the processing circuit is further operable to generate the at least two alternative sequences of files based in part on a user interest determined by the processing circuit.

4. The system of claim 3, wherein the user interest is determined based in part on file sequences previously selected by the user.

5. The system of claim 3, wherein the user interest is determined based in part on a user profile of the user belonging to an interest group of a social network.

6. The system of claim 1, wherein the focus file in the first sequence comprises a text file or a spreadsheet.

7. The system of claim 1, wherein the first display data is further configured to display a thumbnail of the at least a portion of the at least two alternative sequences.

8. The system of claim 7, wherein the first display data is further configured to display other thumbnails of the at least a portion of the at least two alternative sequences in response to a cursor being positioned over the thumbnail.

9. A computerized method for sequencing electronic files comprising:

generating, by a processing circuit, a first sequence of files for a sequential display of the files, the first sequence of files including a focus file;

determining, by the processing circuit, at least two characteristics of the focus file;

generating a first group of at least two alternative sequences of files, each based on a corresponding one of the at least two characteristics of the focus file, wherein at least one of the at least two alternative sequences includes one or more files not present in the first sequence, and wherein the focus file is a part of the at least two alternative sequences of files of the first group;

providing first display data to an electronic display, the first display data configured to display in a first view, at least a portion of the first sequence and at least a portion of the at least two alternative sequences of the first group receiving a selection of a second focus file from one of the at least two alternative sequences of the first group;

determining a characteristic of the second focus file;

generating a second group of at least one alternative sequence of files based on the characteristic of the second focus file; and providing second display data to the electronic display, the second display data configured to display in a second view, at least a portion of the second group of the at least one alternative sequence of files.

10. The method of claim 9, wherein the focus file in the first sequence comprises a digital image.

11. The method of claim 9, further comprising:
generating the second sequence of files based in part on a user interest determined by the processing circuit.

12. The method of claim 11, wherein the user interest is determined based in part on file sequences selected by the user.

13. The method of claim 11, wherein the user interest is determined based in part on a user profile of the user belonging to an interest group of a social network.

14. The method of claim 9, wherein the file in the first sequence comprises a text file or a spreadsheet.

15. The method of claim 9, wherein the first display data is further configured to display a thumbnail of the at least a portion of the at least two alternative sequences, and wherein the first display data is further configured to display other thumbnails of the at least a portion of the at least two alternative sequences in response to a cursor being positioned over the thumbnail.

16. The method of claim 9, wherein the first sequence comprises files located in different albums.

17. A computerized method for sequencing electronic images comprising:
receiving, at a processing circuit, a request to view a slideshow of digital images having a characteristic specified by a user;

generating, by the processing circuit, a first sequence of images having the characteristic;

selecting, by the processing circuit, a focus image for the slideshow from the first sequence of images;

determining, by the processing circuit, at least two characteristics of the focus image of the first sequence;

generating, by the processing circuit, at least two alternative sequences of images, each of the at least two alternative sequences comprising the focus image of the first sequence and one or more images having a corresponding one of the at least two characteristics of the focus image, wherein at least one of the at least two alternative sequences includes one or more images not present in the first sequence;

providing first webpage data to an electronic device, wherein the first webpage data is configured to display the slideshow with the focus image, the slideshow being configured to display the focus image in a first area of the slideshow and one or more other images displayed in a second area of the slideshow, wherein the first area is larger than the second area, the slideshow further configured to display a first graphical user interface input to change the focus image to a second focus image in a select one of the at least two alternative sequences;

determining, by the processing circuit, a characteristic of the second focus image;

generating, by the processing circuit, a second alternative sequence of images having the characteristic of the second focus image; and providing second webpage data to the electronic device, wherein the second webpage data is configured to display the slideshow with the second focus image, the slideshow including a second graphical user interface input to display at least a portion of the second alternative sequence.

18. The method of claim 17, wherein the first graphical user interface input is to replace the focus image with the second focus image in the first area of the slideshow.

* * * * *